(12) United States Patent
Hunt et al.

(10) Patent No.: US 11,163,921 B1
(45) Date of Patent: Nov. 2, 2021

(54) MANAGING A SMART CITY

(71) Applicant: TeleqoTech, Falls Church, VA (US)

(72) Inventors: Katherine Carey Hunt, Falls Church, VA (US); Edward Rene Sanchez Carter, Niceville, FL (US); Kyle Andrew Metiva, Reston, VA (US)

(73) Assignee: TeleqoTech, Falls Church, VA (US)

( * ) Notice: Subject to any disclaimer, the term of this patent is extended or adjusted under 35 U.S.C. 154(b) by 0 days.

(21) Appl. No.: 17/151,241

(22) Filed: Jan. 18, 2021

Related U.S. Application Data

(63) Continuation-in-part of application No. 17/009,759, filed on Sep. 1, 2020, now Pat. No. 10,955,545.

(51) Int. Cl.
| | | |
|---|---|---|
| *G06F 30/13* | (2020.01) | |
| *G01S 17/89* | (2020.01) | |
| *H04L 29/08* | (2006.01) | |
| *G06F 111/18* | (2020.01) | |
| *G01S 13/89* | (2006.01) | |
| *G01S 17/86* | (2020.01) | |
| *G06T 17/05* | (2011.01) | |

(52) U.S. Cl.
CPC .............. *G06F 30/13* (2020.01); *G01S 17/89* (2013.01); *H04L 67/12* (2013.01); *G01S 13/89* (2013.01); *G01S 17/86* (2020.01); *G06F 2111/18* (2020.01); *G06T 17/05* (2013.01); *G06T 2210/56* (2013.01)

(58) Field of Classification Search
CPC ..... H04W 16/20; H04W 24/08; H04W 16/14; H04W 16/18; H04W 64/00; H04W 84/12; H04W 24/02; H04W 24/10; H04W 4/029; H04W 8/005; G01S 5/0252; G01S 5/02; G01S 13/865; G01S 17/931; G01S 17/86; G01S 13/86; G01S 13/89; G01S 17/89; G01S 17/42; G01S 7/4808; G01S 7/4817; G01S 17/87; G01S 7/51; G01S 13/87; G01S 15/89; G05D 1/0274; G05D 1/0088; G05D 2201/0213; G05D 1/0257; G05D 1/0044; G05D 1/0038; G06K 9/6288; B60W 2420/52; G06F 30/13; G06F 3/011; G06F 2111/18; H04L 67/12; G06T 2210/56; G06T 17/05; G06T 17/00; G06T 1/20; G06N 3/006; B60K 2370/31
See application file for complete search history.

(56) References Cited

U.S. PATENT DOCUMENTS

| | | | | |
|---|---|---|---|---|
| 5,668,562 A | * | 9/1997 | Cutrer | G01R 29/10 |
| | | | | 342/165 |
| 8,718,656 B2 | * | 5/2014 | Chen | H04W 24/02 |
| | | | | 455/446 |
| 10,521,962 B1 | * | 12/2019 | Nussbaum | G06Q 40/08 |
| 10,732,001 B1 | * | 8/2020 | Nussbaum | G01C 21/3807 |

(Continued)

FOREIGN PATENT DOCUMENTS

WO  WO-2020069126 A1 *  4/2020  ........... G05D 1/0212

*Primary Examiner* — Olumide Ajibade Akonai

(74) *Attorney, Agent, or Firm* — Ramya Possett

(57) ABSTRACT

A smart city management system may enable creating a digital twin of the smart city based on mapping lidar data for the smart city and radio frequency data for the smart city; determining placement of a set of network devices in the smart city based on the created digital twin; and providing a visualization of the determined placement of the set of network devices.

20 Claims, 7 Drawing Sheets

(56) References Cited

U.S. PATENT DOCUMENTS

| | | | |
|---|---|---|---|
| 2010/0056163 A1* | 3/2010 | Schmidt | H04W 16/18 |
| | | | 455/446 |
| 2017/0090460 A1* | 3/2017 | Andrew | G06T 15/04 |
| 2017/0307746 A1* | 10/2017 | Rohani | G01S 13/42 |
| 2019/0147331 A1* | 5/2019 | Arditi | G05D 1/0274 |
| | | | 706/20 |
| 2020/0050716 A1* | 2/2020 | Dolan | G06T 15/04 |
| 2021/0027524 A1* | 1/2021 | Moss | G06K 9/46 |

* cited by examiner

231A..N: Signal Type 1    232A..N: Signal Type 2    233A..N: Signal Type 3

220

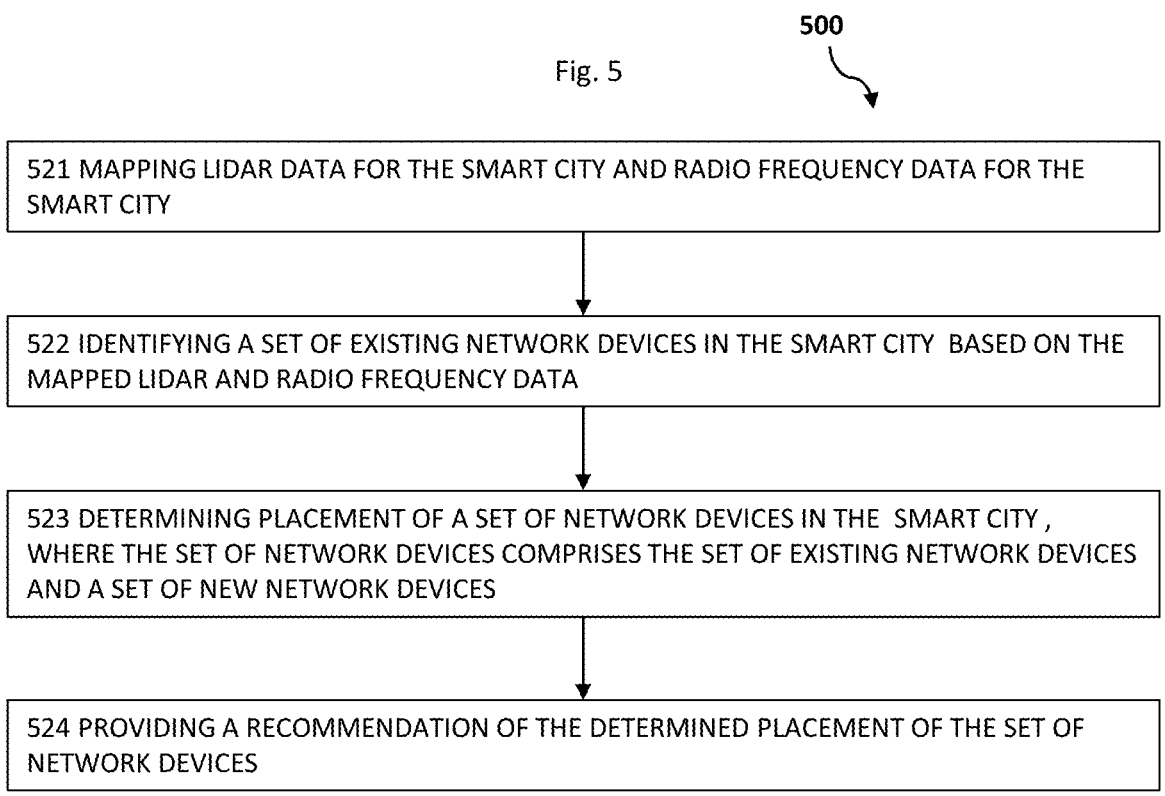

MANAGING A SMART CITY

CROSS-REFERENCE TO OTHER PATENT APPLICATIONS

This application is a continuation-in-part of U.S. patent application Ser. No. 17/009,759, which has been incorporated by reference herein in its entirety.

BACKGROUND

The collection of data about environments and geographic areas is becoming increasingly important as people and organizations try to understand the physical and technological entities in those environments and geographic areas. This is even more salient when trying to install or deploy a smart city. Universal mechanisms and standards for such an installation or deployment do not exist, and an installation or deployment generally requires the cooperation and use of numerous various entities providing different products and services. Determining useful information about environments and geographic areas in order to optimize the deployment or installation of network resources for a smart city can be incredibly difficult, given the increasing amount of data from disparate data sources about these environments and geographic areas.

BRIEF DESCRIPTION OF THE DRAWINGS

The following detailed description references the drawings, wherein:

FIG. 5 is a flow diagram depicting an example method for managing a smart city.

DETAILED DESCRIPTION

Figure 1:
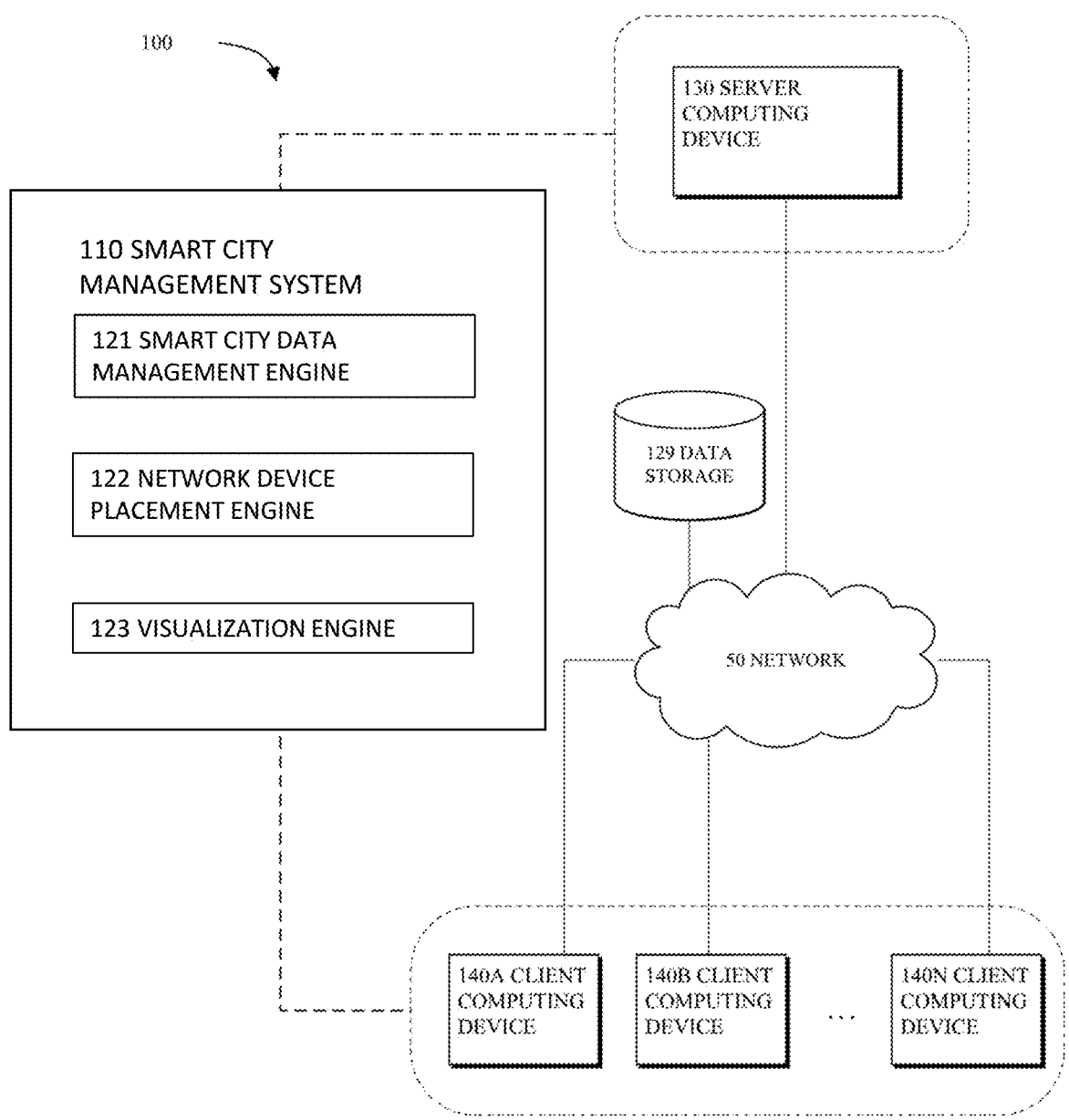
FIG. 1 is a block diagram depicting an example environment in which various examples may be implemented as a smart city system.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The collection of data about environments and geographic areas is becoming increasingly important as people and organizations try to understand the physical and technological entities in those environments and geographic areas. This is even more salient when trying to install or deploy a smart city. Universal mechanisms and standards for such an installation or deployment do not exist, and an installation or deployment generally requires the cooperation and use of numerous various entities providing different products and services. Determining useful information about environments and geographic areas in order to optimize the deployment or installation of network resources for a smart city can be incredibly difficult, given the increasing amount of data from disparate data sources about these environments and geographic areas.

Examples disclosed herein provide technical solutions to these technical challenges by managing smart cities in an automated way that enables installment, development, visualizations, analytics, and recommendations related to the smart city. The solutions described herein enable an improved and effective analysis and presentation of a complicated, large set of data related to managing a smart city. Further, by collecting and analyzing information about both the physical and technological entities about the geographic areas of the smart city, the technical solutions disclosed herein also enable optimization of the physical and especially technological entities in the smart city in a myriad of ways.

Some examples disclosed herein to manage smart cities include creating a digital twin of the smart city based on mapping lidar and imagery data for the smart city and radio frequency data for the smart city; determining placement of a set of network devices in the smart city based on the created digital twin; and providing a visualization of the determined placement of the set of network devices.

Some of the examples disclosed herein to manage smart cities enable mapping lidar and imagery data and radio frequency data for the smart city; identifying a set of existing network devices in the smart city based on the mapped lidar, imagery and radio frequency data; determining placement of a set of network devices in the smart city, where the set of network devices comprises the set of existing network devices and a set of new network devices; and providing a recommendation of the determined placement of the set of network devices.

Some examples disclosed herein to manage smart cities enable instructions to map lidar and imagery data and radio frequency data for the smart city; instructions to identify a set of existing network devices in the city based on the mapped lidar, imagery, and radio frequency data; instructions to determine placement of a set of network devices in the smart city, where the set of network devices comprises the set of existing network devices and a set of new network devices; and instructions to provide a recommendation of the determined placement of the set of network devices.

The terminology used herein is for the purpose of describing particular embodiments only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "coupled," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

FIG. 1 is an example environment 100 in which various examples may be implemented as a smart city management system 110. In some examples, environment 100 may include various components including server computing device 130 and mobile devices 140 (illustrated as 140A, 140B, . . . , 140N). Each client computing device 140A, 140B, . . . , 140N may communicate requests to and/or receive responses from server computing device 130. Server computing device 130 may receive and/or respond to requests from mobile devices 140. Mobile devices 140 may be any type of mobile computing device capable of sending and/or receiving data to server computing device 130. For example, mobile devices 140 may include a laptop computing device, an all-in-one computing device, a thin client, a workstation, a tablet computing device, a mobile phone, an electronic book reader, a network-enabled appliance such as a "Smart" speaker, a network-connected radio, a software defined radio, wideband tuner, and/or other electronic device suitable for collecting data and transmitting that data to the server computing device 130. While server computing device 130 is depicted as a single computing device, server computing device 130 may include any number of integrated or distributed computing devices serving at least one software application for consumption by mobile devices 140. Data store 129 can be any non-transitory machine-readable storage. In some examples, data store 129 can comprise a Solid State Drive (SSD), Hard Disk Drive (HDD), a database, a networked database storage system, a cloud storage, and/or other type of data store that stores information related to smart city management system 110.

The various components (e.g., components 129, 130, and/or 140) depicted in FIG. 1 may be coupled to at least one other component via a network 50. Network 50 may comprise any infrastructure or combination of infrastructures that enable electronic communication between the components. For example, network 50 may include at least one of the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or another network.

According to various implementations, smart city management system 110 and the various components described herein may be implemented in hardware and/or a combination of hardware and programming that configures hardware. Furthermore, in FIG. 1 and other Figures described herein, different numbers of components or entities than depicted may be used.

Smart city management system 110 may comprise a smart city data management engine 121, a network device placement engine 122, a visualization engine 123, and/or other engines. The term "engine", as used herein, refers to a combination of hardware and programming that performs a designated function. As is illustrated respect to FIG. 3, the hardware of each engine, for example, may include one or both of a processor and a machine-readable storage medium, while the programming is instructions or code stored on the machine-readable storage medium and executable by the processor to perform the designated function.

Smart city data management engine 121 may manage data related to a smart city. A smart city may refer to a geographic area, comprising a municipality, city, town, village, and/or other geographically bound area. In some examples, a smart city may be mapped into one or more zones, where each zone includes a sub-portion of the smart city geographically. In some examples, zones may further be broken up into sub-zones, etc., to better enable management of network devices in a smart city at a more granular level.

A smart city may have millions and/or even billions of wireless devices (e.g., mobile phones, smart phones, tablets, "smart" devices, internet of things (IoT) devices, and/or other devices that have wireless capabilities) operating therein. As such, a smart city may need to have a substantial amount of network devices (e.g., switches, routers, access points, gateways, cameras, wireless emitters, sensors, IoT sensors, and/or other network devices that enable propagation and management of wireless signals, wireless devices, and/or smart city management) at appropriate locations in order to enable and manage the usage of the wireless devices operating therein.

Smart city data management engine 121 may map lidar and imagery data and radio frequency data for the smart city. For example, the lidar data and radio frequency data may be mapped to each other, based on Global Positioning System (GPS) coordinates. The smart city data management engine 121 may map the lidar data and radio frequency data in a manner, that is the same as or similar to the functionality described in U.S. patent application Ser. No. 17/009,759 (which is incorporated herein by reference). In some examples, the smart city data management engine 121 may also map imagery data with the mapped lidar and radio frequency data in a manner, that is the same as or similar to the functionality described in U.S. patent application Ser. No. 17/009,759.

In some examples, the smart city data management engine 121 may create a digital twin of the smart city based on the mapped lidar and imagery data for the smart city and radio frequency data for the smart city. A digital twin may comprise, for example, a digital representation of the physical and wireless environment of the smart city. In some examples, smart city data management engine 121 may create the digital twin by also mapping the lidar and imagery data and radio frequency data with imagery data for the smart city. In some examples, the smart city data management engine 121 may also identify existing network devices and/or existing wireless devices in the smart city based on wireless signatures being emitted by the existing network devices and/or wireless devices. As such, the digital twin created by the smart city data management engine 121 may include lidar data, radio frequency data, imagery data, wireless device data, network device data, any combination thereof, and/or other data related to the smart city.

The smart city data management engine 121 may also manage and/or update the digital twin of the smart city. For example, the smart city data management engine 121 may periodically update some or all of the data used to create the digital twin. In some examples, the smart city data management engine 121 may automatically update the digital twin at predetermined intervals, upon a request to deploy an additional and/or new network device, upon detecting a change in existing wireless and/or network devices, upon new data being received by the smart city management system 110, upon a request received from a user of the smart city management system 110, upon a request received from another system, and/or for other reasons.

In some examples, the smart city data management engine 121 may create, manage, and/or update digital twins for each zone of the smart city. In some examples, the smart city data management engine 121 may maintain, manage, and/or update merely lidar and imagery data and radio frequency data for the smart city and/or each of its zones.
Upon collection of this data for the smart city and/or each of its zones, smart city data management engine 121 may store the collected data in data storage 129.

Network device placement engine 122 may determine placement of a set of network devices in the smart city. In some examples, network device placement engine 122 may determine placement of the set of network devices in the smart city based on the mapped lidar and radio frequency data, the created digital twin, and/or any other data related to the smart city.

In some examples, the network device placement engine 122 may determine the set of network devices to place in the smart city. In some examples, the set of network devices may include the existing set of network devices in the smart city and a new set of network devices, or may just include a new set of network devices to place in the smart city.

The network device placement engine 122 may determine the set of network devices based on information received about a required set of capabilities in each zone of the set of zones in the smart city. For example, the network device placement engine 122 may determine a matching set of network devices that provide the required set of capabilities. The network device placement engine 122 may also determine the geographical positions at which to place the set of network devices based on one or more factors, including the required set of capabilities and specifications (e.g., coverage, dimension, size, frequency, functionality, compatibility, etc.) of each matching network device, physical infrastructure of a location in which the network device is to be placed, wireless infrastructure of the location, the mapped lidar and radio frequency data of the location, imagery data for the location, the existing network devices in the location, the existing wireless devices in the location, any combination thereof, and/or other data related to the location.

"Location," as used herein, may comprise the smart city, one or multiple zones in the smart city, one or multiple sub-zones, one or multiple blocks of the city, an area defined by a set of longitudinal and latitudinal coordinates in the city, and/or another geographic area of the city.

"Physical infrastructure," as used herein, may include physical objects, physical terrain, physical buildings, roads, bridges, walls, fences, signage, utility poles, and/or other physical attributes of a location. "Wireless infrastructure," as used herein, may include energy and/or wireless signals emanating in wireless frequencies across the Radio Frequency spectrum. Wireless infrastructure may correlate to physical infrastructure in that physical objects (antennas, phones, WiFi routers, wireless cameras, laptops, etc) propagate the wireless signals.

As mentioned above, in some examples, the network device placement engine 122 may identify existing network devices in the location. In some of these examples, the network device placement engine 122 may determine where to place a set of new network devices based on the placement of existing network devices in the smart city. For example, the network device placement engine 122 may determine a set of capabilities required in the location that are not met by the existing network devices, and may determine a matching set of new network devices that provide the required set of capabilities. The network device placement engine 122 may determine the geographical positions at which to place the set of new network devices based on one or more factors, including the required set of capabilities and specifications (e.g., coverage, dimension, size, frequency, functionality, compatibility, etc.) of each matching network device, physical infrastructure of a location in which the network device is to be placed, wireless infrastructure of the location, the mapped lidar and radio frequency data of the location, imagery data for the location, the existing network devices in the location, the existing wireless devices in the location, any combination thereof, and/or other data related to the location.

In some of these examples, the network device placement engine 122 may also consider the signal information from the set of existing network devices in order to determine the signal types and/or functionalities needed in the location. Signal information may comprise, for example, mobile network data, frequency or channel, network type, network protocol, signal strength, coverage area, cellID, timing advance, Wifi/BlueTooth: Band, SSID, MAC, RSSI signal strength, authentication mode, coverage area, baud rate, modulation type, data on future developments on additional spectrum like wideband spectrum (frequency or channel, signal strength, coverage area, etc.), and/or other data related to a wireless signal. A wireless signature may comprise data from the signal information that could be used to identify a wireless device and/or manufacturer of a wireless device.

In some of these examples, the network device placement engine 122 may also consider the wireless signatures available in the location to identify the wireless devices and/or network devices that may already be present in the network. In these examples, the network device placement engine 122 may proactively de-conflict signals from the set of existing network devices, the planned new set of network devices, other existing wireless devices in the location, and/or any combination thereof. For example, the network device placement engine 122 may identify wireless signals related to 2G, 3G, 4G, and/or 5G wireless communication in the location and may de-conflict signals from existing network devices and planned new network devices in the location. In these examples, the network device placement engine 122 may identify what frequencies are currently in use in a location. By doing so, the network device placement engine 122 may identify potential gaps in the spectrum of frequencies used and may identify unused frequencies that are still available for us. The identification of available frequencies can be increasingly important for network devices that use Wi-Fi or BlueTooth, as the usage of these devices are multiplying at a rapid rate. Such an identification also may enable the driving of regulatory conversations when applying for licenses in the VHF/UHF/Microwave/MMwave bands.

The network device placement engine 122 may also consider the network spectrum available in the location to determine the set of new network devices to place in the location. For example, the network device placement engine 122 may consider what frequency bands are being used and select network devices and frequencies that do not conflict with the used frequency bands in the spectrum.

In some examples, the network device placement engine 122 may identify existing physical and/or wireless infrastructure based on the mapped lidar and radio frequency data and the wireless signatures determined in a location. In some examples, the network device placement engine 122 may also consider imagery data mapped to the lidar and radio frequency data for the location. The network device placement engine 122 may perform asset extraction on key features in the location based on the identified existing physical and wireless infrastructure. For example, the network device placement engine 122 may identify utility poles for mounting network devices such as emitters or sensors, or manhole covers to identify existing fiber technology. The network device placement engine 122 may also identify physical objects and/or terrain in the location that could cause signal obstructions using the three-dimensional lidar, radio frequency, imagery, and/or other data in the data store 129. Based on that identification, the network device placement engine 122 may optimize placement of new network devices to reduce signal obstruction, signal conflicts, and/or other issues that could cause a degradation or less optimal usage of the network devices. In some examples, the network device placement engine 122 may also identify specific network gaps in the wireless environment of the location, may identify the existing strongest signals with the best data throughput at the location, may determine where to place a network device to obtain the strongest signals with the best data throughput at the location, may determine what existing network devices to remove for deconfliction and to avoid interference and congestion, and/or may otherwise determine type and placement of a new network device in the location to optimize a smart city infrastructure.

As such, with the network device placement engine 122, de-confliction of signals is based on ground truth instead of mere theoretical modeling. Further, with the span of signal from 5G, de-conflicting signals from all of the different devices and different compatibilities on different frequencies with the amount and scale of existing wireless and existing network devices may be daunting or even impossible without an automated capability like that provided by the network device placement engine 122.

By considering this de-confliction along with the physical terrain of the location, the capabilities required or requested in the location, the mapped lidar and radio frequency data, imagery data for the location, the existing wireless devices, the existing network devices, any combination thereof, and/or other information related to the location, the network device placement engine 122 may provide an optimized placement of the new set of network devices for the location.

In some examples, network device placement engine 122 may continually update the placement of existing and new network devices at predetermined, random, and/or user-initiated intervals.

The network device placement engine 122 may store information related to the determined and updated placements, and the data used to make the placements, along with timestamps and other related data in data storage 129. In some examples, along with each stored placement of network devices, network device placement engine 122 may also store, for each existing and/or new network device, a device name, device ID, device location data, network information data, network protocol data, signal strength data, SSID, MCC/MNC data, LAC/TAC data, CellID data, Band data, ARFCN data for GSM, EARFCN data for LTE, RSSNR data, RSRQ data, ENBRNC data, LCID data, baud rate, modulation type, unit data, latitude data, longitude data, speed data, timestamp, capabilities data, and/or other information related to the network device. The network device placement engine 122 may use the information to update the placement of existing and new network devices.

In some examples, network device placement engine 122 may use the data related to the smart city to make predictions about a network event that could occur. For example, the network device placement engine 122 may analyze the data related to a location over time to determine a degradation of signal strength in a sub-area of the geolocation, a loss of a network device, a need for additional network device(s) to improve signal strength, a drop in network coverage, a new signal that has been collected, a new physical object that has been detected, or some other type of network event has occurred. In some examples, the network event may comprise the prediction of signal strength at a given location at a future point in time. In some examples, the network event may comprise a difference between expected network coverage and existing signal coverage exceeding a predetermined threshold, based on collected radio frequency data related to signal strength. The network device placement engine 122 may use the predications to determine and/or update the placement of existing and new network devices.

In some of these examples, network device placement engine 122 may provide an alert related to the predicted network event. For example, the network device placement engine 122 may provide an alert that a network event may occur at a determined time interval, or may provide information about the network event.

In some of these examples, network device placement engine 122 may analyze the data related to the smart city over time to provide a plan for maintenance and upgrades of the wireless network(s) in the smart city.

In some of these examples, network device placement engine 122 may analyze the data related to the smart city to plan spectrum usage in the smart city.

In some of these examples, network device placement engine 122 may analyze the data related to the smart city to provide feedback to a telecommunications provider on deconfliction of frequency bands in licensed and unlicensed space based on the measured signal strength and physical terrain information included in the related data.

In some examples, network device placement engine 122, and smart city management system 110 as a whole, may provide ground truth data to telecommunication providers about the smart city. Smart city management system 110 may provide recommendations related to positions of network devices and plans for maintenance and upgrades of the telecommunication network provider's network in the smart city. In some of these examples, telecommunications providers that provide high radio frequency networks (e.g., 5G, 6G, and/or other high radio frequency networks) may use smart city management system 110 for a better implementation and roll out of their high radio frequency network.

Returning to FIG. 1, to enable such planning and management, visualization engine 123 may provide a visualization of the smart city, or a location, with a recommended placement of each of the required set of devices.

In some examples, the visualization engine 123 may provide a map of the determined placement of the set of network devices in the smart city. In some examples, the map may be an interactive map, and the visualization engine 123 may enable the zooming in and/or out of the interactive map into a specific zone, sub-zone, location, etc., to get a closer or broader look at the determined placements. The visualization engine 123 may also depict the stored data about the smart city on the map. For example, the visualization engine 123 may depict the lidar data, radio frequency data, imagery data, wireless signal data, physical terrain, city infrastructure, existing network devices, and/or other data related to the smart city. In some of these examples, the visualization engine 123 may enable the selection of one or multiple types of the data related to the smarty city to be shown as overlaid on the section of the map being viewed.

The visualization engine 123 may also enable the selection of one or multiple data points in the map. Responsive to receiving the selection, the visualization engine 123 may show additional data related to the one or multiple data points. For example, responsive to a selection of a network device, some or all data related to the network device may be depicted by the visualization engine 123. In another example, responsive to a selection of an existing wireless device, the visualization engine 123 may depict information about the wireless environment in the section of the map being viewed. In some of these examples, responsive to selection of a new network device, the visualization engine 123 may enable options for purchase of the new network device or devices similar to the new network device. For example, the visualization engine 123 may provide a marketplace for network devices that could be used in the smart city. The types of information displayed by the visualization engine 123 in response to the selection of types of data points (e.g., devices, lidar data, imagery data, city infrastructure, wireless signal data, lidar point cloud, radio frequency data, and/or other types of data), is not limited to the examples described herein.

In some examples, the visualization engine 123 may enable the placement and/or movement of a network device in a section of the map being viewed. Response to receiving an input to change information related to a placement of a first network device of the set of network devices in the section of the map being viewed, the visualization engine 123 may cause the network device placement engine 122 to re-determine the placement of the set of network devices based upon the new placement of the first network device, in a manner the same as or similar to that described above. The visualization engine 123 may then provide an updated visualization of the re-determined placement of the set of network devices, including the new placement of the first network device. As such, the visualization engine 123 (and smart city management system 110) may provide a recommendation for placement of a set of network devices but may also enable customization by a user of the system of a sub-set or all of the network devices, and may update the recommendation based on the received user customization(s).

In some examples, the visualization engine 123 may enable interaction with the map in an augmented and/or virtual reality environment. The visualization engine 123 may enable customization of the placement of the network devices, interaction with the data in the section of the map being viewed, the display of additional information related to selected data in the section of the map being viewed, and/or other interactions with the map in the augmented and/or virtual reality environment as well.

FIGS. 2A-2D, which will be described in further detail below, show visualizations of various locations overlaid with various types of data from the smart city management system 110, and depict how the overlaid data can be used for identification, planning, and management purposes, among others. The visualizations available via the smart city management system 110 and the visualization engine 123 described below are not limited to the visualizations depicted in FIGS. 2A-2D.

Figure 2A:
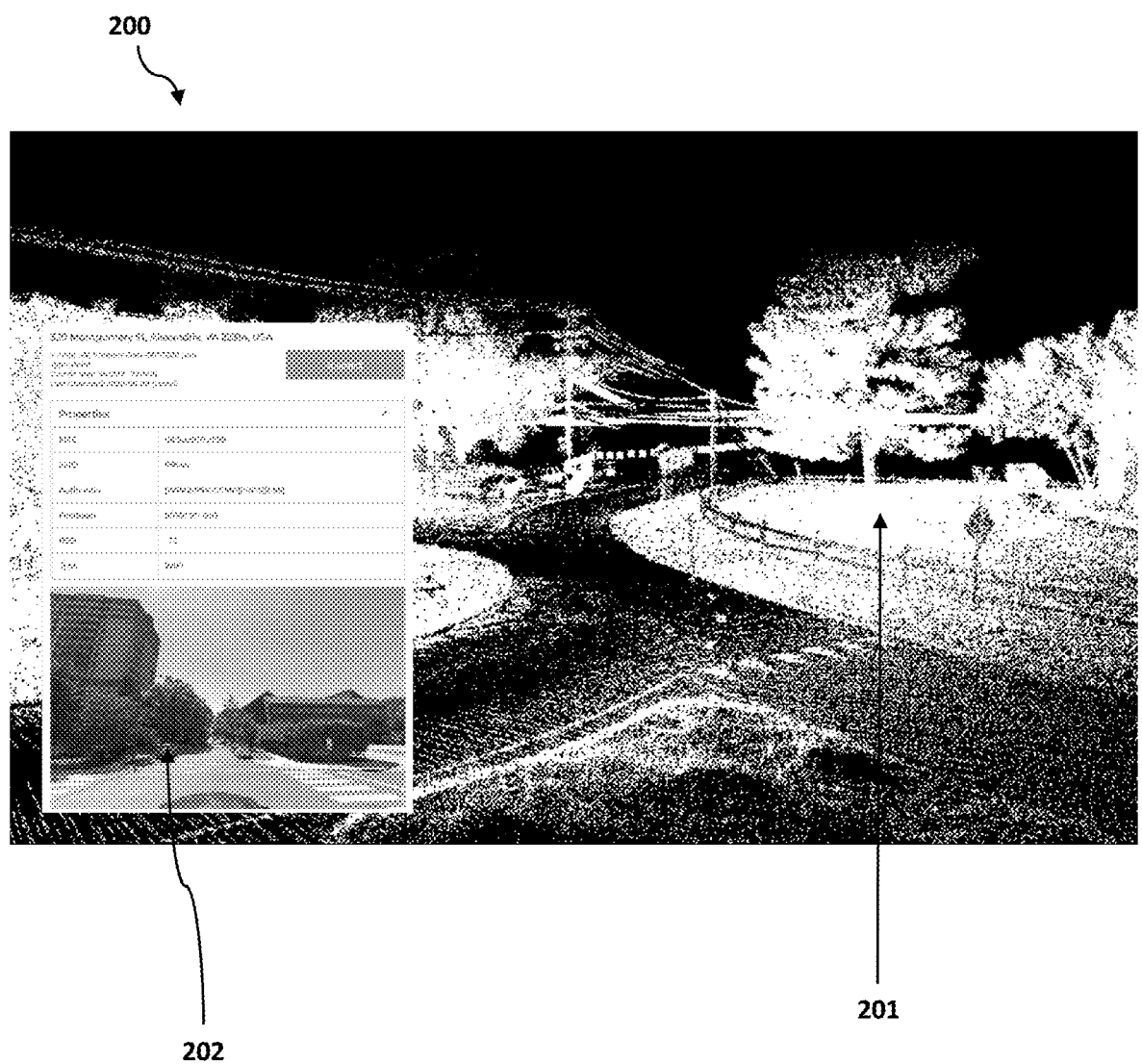
FIG. 2A is a diagram depicting an example user interface for managing a smart city.

In FIG. 2A, one example of visualization 200 of the data from the smart city management system 110 in a location is depicted. In the example illustrated in FIG. 2A, the radio frequency data may be represented by an overlay box 202 over the lidar point cloud 201. The overlay may include further information about wireless data included in the radio frequency data. Example of the type of wireless data shown in overlay box 202 is not limited to the type of radio frequency data that could be included in the overlay box 202. In some examples, the data shown in the overlay box 202 may be a predetermined set of data, may be determined from a user request to the visualization engine 123, may be machine learned from the smart city management system 110, and/or may otherwise be determined.

Figure 2B:
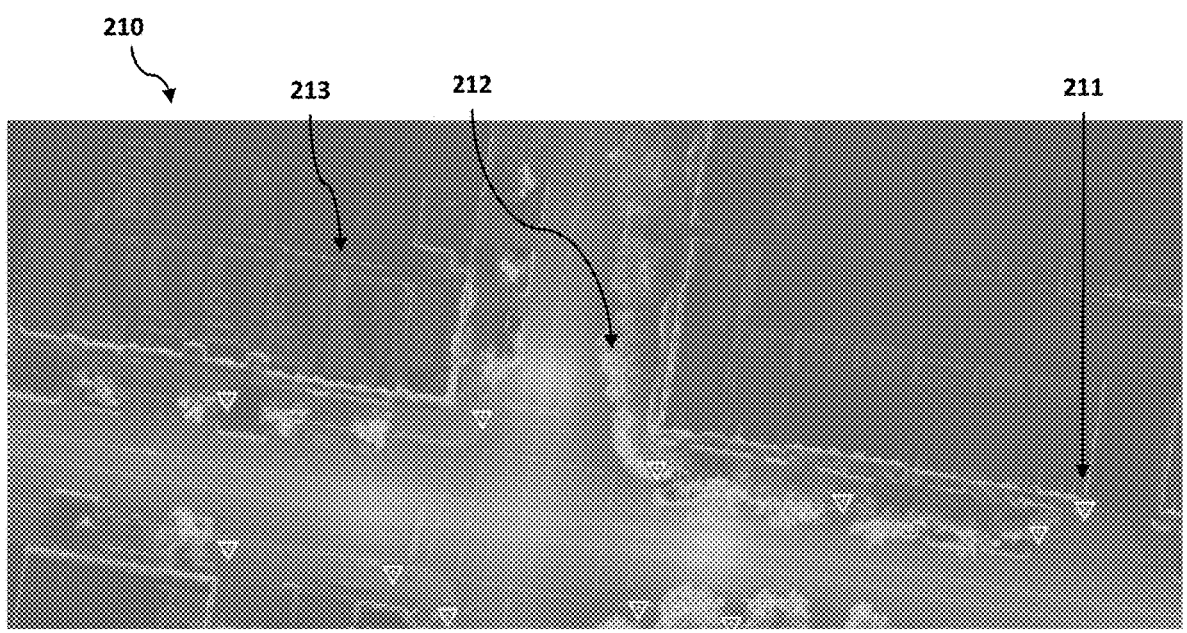
FIG. 2B is a diagram depicting an example user interface for managing a smart city.

In FIG. 2B, another example of visualization 210 of the data from the smart city management system 110 in a location is depicted. In the example illustrated in FIG. 2B, the radio frequency data may be represented by a set of graphical elements 211, the lidar data may be represented by a lidar point cloud 212, and the imagery data 213 may be represented by imagery included in the visualization 210.

Figure 2C:
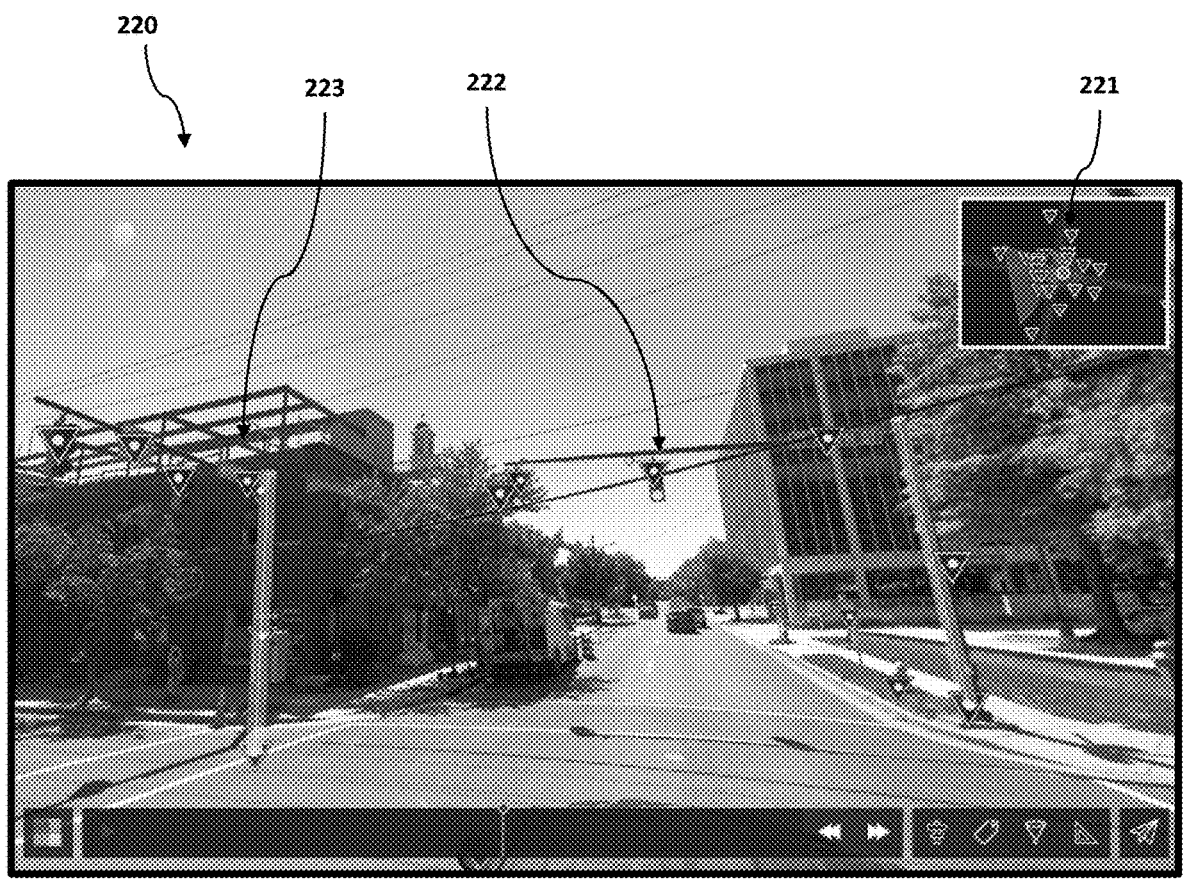
FIG. 2C is a diagram depicting an example user interface for managing a smart city.

In FIG. 2C, another example of visualization 220 of the data from the smart city management system 110 in a location is depicted. In the example illustrated in FIG. 2C, the imagery data for the location may be depicted, along with city infrastructure being represented by graphical elements 222, 223, and potential existing network devices being represented by graphical elements 221 included in the visualization 220.

Figure 2D:
FIG. 2D is a diagram depicting an example user interface for managing a smart city.
Figure 2D:
Figure 2D:
Figure 2D:
Figure 2D:

In FIG. 2D, another example of visualization 230 of the data from the smart city management system 110 in a location is depicted. In the example illustrated in FIG. 2D, different types of wireless signals may be represented by graphical elements 231, 232, 233 included in the visualization 230.

Returning to FIG. 1, the visualization engine 123 may provide a visualization of the data related to the smart city and/or for a location in the smart city using other types of depictions of the geographic area as well, such as a geographical map, topographical map, highway map, photographic map, heat map, and/or other map type depicting of the geographic area. The visualization engine 123 may also provide different types of visualizations of the geographic area, including, but not limited to a lidar point cloud, lidar map, wireless map, colorized lidar point cloud, and/or other base type of visualization upon which additional data may be overlaid. For example, the visualization engine 123 may provide a map depicting the physical locations associated with properties associated with the collected radio frequency data and collected lidar data. In another example, the visualization engine 123 may provide a heat map related to the mapped radio frequency data and mapped lidar data to better depict the relationship between the physical terrain and signal strengths in the geographic area.

In some examples, the visualization engine 123 may provide one or multiple map types and/or visualizations related to the mapped data. In some examples, the visualization engine 123 may enable the changing of visualization from one map to another. For example, the visualization engine may enable the change of a visualization from a lidar point cloud to photographic imagery, may combine the lidar point cloud and the photographic imagery to enable a colorized lidar point cloud. In another example, the visualization engine 123 may enable changing from a combination of map type and visualization type (e.g., heat map and lidar point cloud to geographical map and colorized lidar point cloud). The types of maps and types of visualizations of the mapped radio frequency data and lidar data are not limited to the examples described herein and can be changed based on the context of use of the mapped radio frequency data and lidar data as well.

In some examples, the visualization engine 123 may provide a time-bound visualization of the depicted data. For example, the visualization engine 123 may include a time bar or other time indicator that may be selectable or changed. In these examples, the visualization engine may enable a visualization of the change of the depicted data over time, based on a selection of a specific time or time range via the time bar/time indicator. In some of these examples, the visualization engine 123 may provide a special indicator for objects and/or individual data points of the depicted data that appear or disappear as the time bar/time indicator selection is changed.

In some examples, smart city management system 110 may collect the radio frequency data, wireless data, lidar data, and/or other data from vehicles, scooters, segways, aircraft, drones, and/or other transportation devices that use wireless signals for data. In these examples, smart city management system 100 may use the collected data to improve the determined placement of network devices in the smart city, and/or the autonomous functionality of these transportation devices, including physical object avoidance and better signal strength and coverage.

In some examples, smart city management system 110 may provide information related to infrastructure (e.g., roads, rest areas, and/or other infrastructure objects) that may be covered by wireless signals to assist in communication and planning related to infrastructure, construction, and/or other transportation related needs.

In some examples, smart city management system 110 may track the wireless devices in a location. The smart city management system 110 may track the devices for traffic usage, to determine the types of devices that are being used, to track the efficiency of the placement of existing network devices, update the placement of network devices in the location, and/or to otherwise optimize the placement of network devices in the smart city.

In some examples, smart city management system 110 may determine whether risks exist in a geographic location (e.g., a secure area, a government property, an isolated corporate property, etc.) based on the data used by the smart city management system 110. For example, the smart city management system 110 may provide an alert if an unauthorized network device is found in the geographic location, if a wireless signal has characteristics that change more than a predetermined threshold over a period of time, if signal obstruction occurs, if the usage of wireless devices in the geographic area indicate an abnormality, and/or if other activities that may be determined to be risks occur.

In some examples, the smart city management system 110 may analyze the data related to the smart city to monitor conditions related to natural disasters, critical drainage infrastructure, and/or other municipal emergencies. In other examples, smart city management system 110 may analyze the data related to the smart city to monitor conditions with factories, plants, data centers, land-based oil pipelines, oil drilling platforms, solar wind farms, vending machines, payment processing machines, and/or for other corporate uses. In some examples, the smart city management system 100 may predict new deployments of network devices and/or other equipment related to the analysis of the data related to the smart city.

In some examples, smart city management system 110 may analyze the data related to the smart city to increase public safety. For example, the smart city management system 100 may provide alerts and/or predictions related to coverage using collected data related to police dashboard, body cam, and/or other police related, network enabled equipment. Similarly, the smart city management system 110 may enhance coverage for fire departments based on sensors available with ambulances and reduce response time based on the mapped radio frequency data and lidar data.

In performing their respective functions, engines 121-123 may access data storage 129 and/or other suitable database(s). Data storage 129 may represent any memory accessible to smart city management system 110 that can be used to store and retrieve data. Data storage 129 and/or other database may comprise random access memory (RAM), read-only memory (ROM), electrically-erasable programmable read-only memory (EEPROM), cache memory, floppy disks, hard disks, optical disks, tapes, solid state drives, flash drives, portable compact disks, and/or other storage media for storing computer-executable instructions and/or data. Smart city management system 110 may access data storage 129 locally or remotely via network 50 or other networks.

Data storage 129 may include a database to organize and store data. The database may reside in a single or multiple physical device(s) and in a single or multiple physical location(s). The database may store a plurality of types of data and/or files and associated data or file description, administrative information, or any other data.

FIGS. 2A-2D are diagrams depicting an example user interface 200 for managing a smart city. FIGS. 2A-2D are described herein with respect to FIG. 1.

Figure 3:
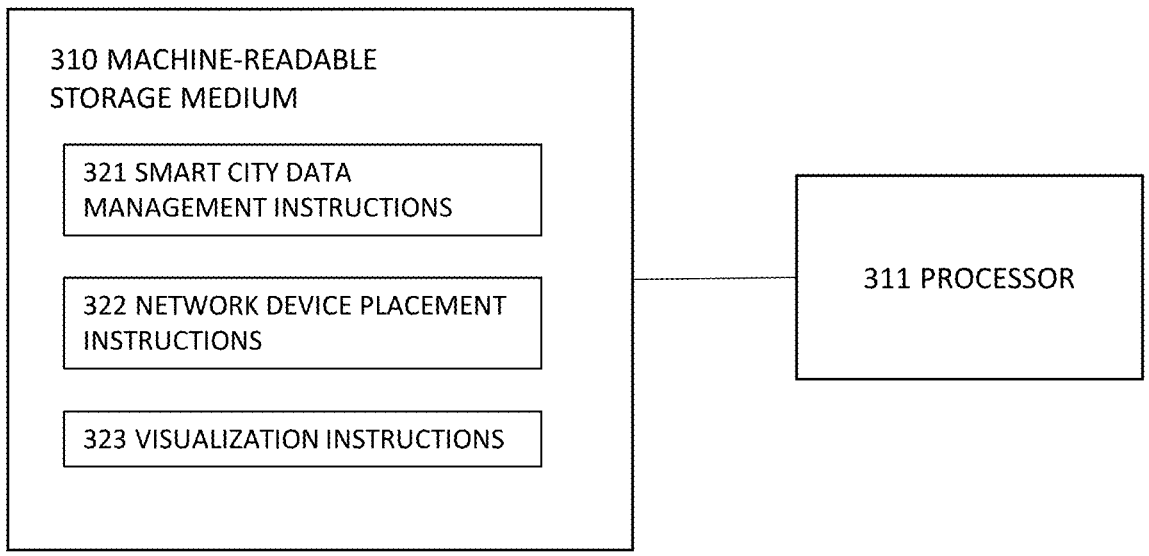
FIG. 3 is a block diagram depicting an example machine-readable storage medium comprising instructions executable by a processor for managing a smart city.

FIG. 3 is a block diagram depicting an example machine-readable storage medium 310 comprising instructions executable by a processor for managing a smart city.

In the foregoing discussion, engines 121-123 were described as combinations of hardware and programming. Engines 121-123 may be implemented in a number of fashions. Referring to FIG. 3, the programming may be processor executable instructions 321-323 stored on a machine-readable storage medium 310 and the hardware may include a processor 311 for executing those instructions. Thus, machine-readable storage medium 310 can be said to store program instructions or code that when executed by processor 311 implements smart city management system 110 of FIG. 1.

In FIG. 3, the executable program instructions in machine-readable storage medium 310 are depicted as smart city data management instructions 321, network device placement instructions 322, and visualization instructions 323. Instructions 321-323 represent program instructions that, when executed, cause processor 311 to implement engines 121-123, respectively.

Machine-readable storage medium 310 may be any electronic, magnetic, optical, or other physical storage device that contains or stores executable instructions. In some implementations, machine-readable storage medium 310 may be a non-transitory storage medium, where the term "non-transitory" does not encompass transitory propagating signals. Machine-readable storage medium 310 may be implemented in a single device or distributed across devices. Likewise, processor 311 may represent any number of processors capable of executing instructions stored by machine-readable storage medium 310. Processor 311 may be integrated in a single device or distributed across devices. Further, machine-readable storage medium 310 may be fully or partially integrated in the same device as processor 311, or it may be separate but accessible to that device and processor 311.

In one example, the program instructions may be part of an installation package that when installed can be executed by processor 311 to implement smart city management system 110. In this case, machine-readable storage medium 310 may be a portable medium such as a floppy disk, CD, DVD, or flash drive or a memory maintained by a server from which the installation package can be downloaded and installed. In another example, the program instructions may be part of an application or applications already installed. Here, machine-readable storage medium 310 may include a hard disk, optical disk, tapes, solid state drives, RAM, ROM, EEPROM, or the like.

Processor 311 may be at least one central processing unit (CPU), microprocessor, and/or other hardware device suitable for retrieval and execution of instructions stored in machine-readable storage medium 310. Processor 311 may fetch, decode, and execute program instructions 321-323, and/or other instructions. As an alternative or in addition to retrieving and executing instructions, processor 311 may include at least one electronic circuit comprising a number of electronic components for performing the functionality of at least one of instructions 321-323, and/or other instructions.

Figure 4:
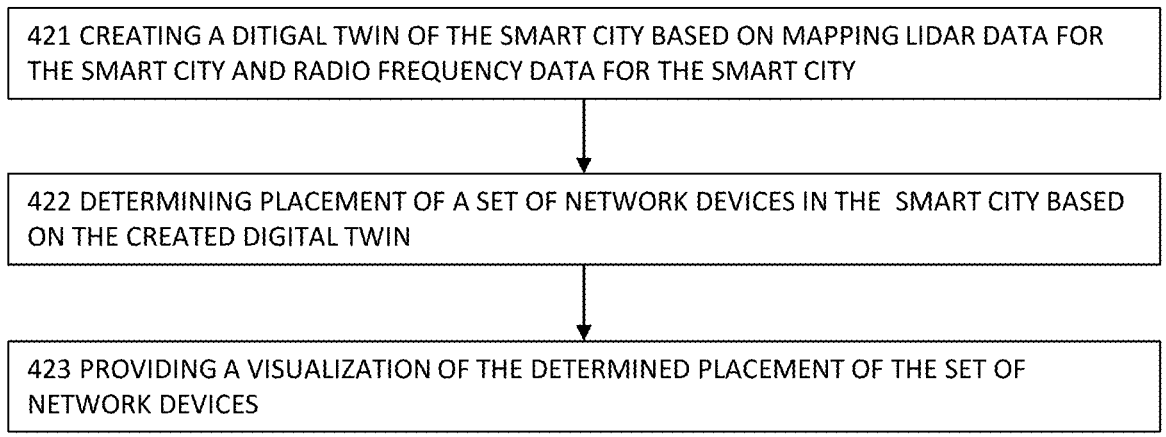
FIG. 4 is a flow diagram depicting an example method for managing a smart city.

FIG. 4 is a flow diagram depicting an example method 400 for managing a smart city. The various processing blocks and/or data flows depicted in FIG. 4 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 400 as illustrated (and described in greater detail below) is meant to be an example and, as such, should not be viewed as limiting. Method 400 may be implemented in the form of executable instructions stored on a machine-readable storage medium, such as storage medium 310, and/or in the form of electronic circuitry.

In block 421, method 400 may include creating a digital twin of the smart city based on mapping lidar data for the smart city and radio frequency data for the smart city. Referring to FIG. 1, smart city data management engine 121 may be responsible for implementing block 421.

In block 422, method 400 may include determining placement of a set of network devices in the smart city based on the created digital twin. Referring to FIG. 1, network device placement engine 122 may be responsible for implementing block 422.

In block 423, method 400 may include providing a visualization of the determined placement of the set of network devices. Referring to FIG. 1, visualization engine 123 may be responsible for implementing block 423.

FIG. 5 is a flow diagram depicting an example method 500 for managing a smart city. The various processing blocks and/or data flows depicted in FIG. 5 (and in the other drawing figures described herein) are described in greater detail herein. The described processing blocks may be accomplished using some or all of the system components described in detail above and, in some implementations, various processing blocks may be performed in different sequences and various processing blocks may be omitted. Additional processing blocks may be performed along with some or all of the processing blocks shown in the depicted flow diagrams. Some processing blocks may be performed simultaneously. Accordingly, method 500 as illustrated (and described in greater detail below) is meant to be an example and, as such, should not be viewed as limiting. Method 500 may be implemented in the form of executable instructions stored on a machine-readable storage medium, such as storage medium 310, and/or in the form of electronic circuitry.

In block 521, method 500 may include mapping lidar data and radio frequency data for the smart city. Referring to FIG. 1, smart city data management engine 121 may be responsible for implementing block 521.

In block 522, method 500 may include identifying a set of existing network devices in the smart city based on the mapped lidar and radio frequency data. Referring to FIG. 1, network device placement engine 122 may be responsible for implementing block 422.

In block 523, method 500 may include determining placement of a set of network devices in the smart city, where the set of network devices comprises the set of existing network devices and a set of new network devices. Referring to FIG. 1, network device placement engine 122 may be responsible for implementing block 523.

In block 524, method 500 may include providing a recommendation of the determined placement of the set of network devices. Referring to FIG. 1, visualization engine 123 may be responsible for implementing block 524.

The foregoing disclosure describes a number of example implementations for managing a smart city. The disclosed examples may include systems, devices, computer-readable storage media, and methods for managing a smart city. For purposes of explanation, certain examples are described with reference to the components illustrated in FIGS. 1-5. The functionality of the illustrated components may overlap, however, and may be present in a fewer or greater number of elements and components.

Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 4 and 5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples. All such modifications and variations are intended to be included within the scope of this disclosure and protected by the following claims.

What is claimed is:

1. A computer-implemented method for managing a smart city, the method being implemented by a physical processor implementing machine readable instructions, the method comprising:

creating a digital twin of the smart city based on mapping lidar data for the smart city and radio frequency data for the smart city, the digital twin comprising the mapped lidar data and the mapped radio frequency data for the smart city;

determining placement of a set of network devices in the smart city based on the created digital twin; and providing a visualization of the determined placement of the set of network devices.

2. The computer-implemented method of claim 1, wherein determining the placement of the set of network devices comprises:

determining the placement of the set of network devices based on information related to a subset of the set of network devices, the subset of the set of network devices comprising a set of existing network devices in the smart city, and the information comprising signal information from the set of existing network devices.

3. The computer-implemented method of claim 2, wherein determining the placement of the set of network devices comprises:
de-conflicting signals from the set of existing network devices in the smart city.

4. The computer-implemented method of claim 1, wherein determining the placement comprises:
determining a first network device from the set of network devices to place in the smart city based on a first set of capabilities associated with the first network device; and
determining placement of the first network device based on a physical terrain of the smart city and the mapped lidar and radio frequency data.

5. The computer-implemented method of claim 1, wherein determining the placement comprises:
for a first zone in a set of zones in the smart city, analyzing information related to a terrain of the first zone;
analyzing a wireless environment of the first zone; and
determining placement of a subset of the set of network devices in the first zone based on the analysis of the information related to the terrain and the analysis of the wireless environment.

6. The computer-implemented method of claim 1, wherein determining the placement comprises:
receiving information about a required set of devices in a first zone in a set of zones in the smart city; and
wherein providing the visualization comprises:
providing a visualization of the first zone with a recommended placement of each of the required set of devices.

7. The computer-implemented method of claim 1, wherein providing the visualization comprises:
providing an interactive map of the determined placement of the set of network devices in the smart city;
receiving input to change information related to a first placement of a first device of the set of network devices;
re-determining placement of the set of network devices based on the received input; and
providing an updated visualization of the re-determined placement of the set of network devices, including a second placement of the first device in the smart city.

8. The computer-implemented method of claim 7, wherein the interactive map is provided in a virtual reality environment.

9. A computer-implemented method for managing a smart city, the method being implemented by a physical processor implementing machine readable instructions, the method comprising:
creating a digital twin of the smart city mapping lidar data and radio frequency data for the smart city, the digital twin comprising the mapped lidar data and the mapped radio frequency data for the smart city;
identifying a set of existing network devices in the smart city based on the mapped lidar and radio frequency data;
determining placement of a set of network devices in the smart city, where the set of network devices comprises the set of existing network devices and a set of new network devices; and providing a recommendation of the determined placement of the set of network devices.

10. The computer-implemented method of claim 9, further comprising:
creating the digital twin of the smart city based on imagery data for the smart city and the mapped lidar data and radio frequency data for the smart city.

11. The computer-implemented method of claim 9, wherein determining the set of new network devices is based on a network spectrum available in the smart city.

12. The computer-implemented method of claim 9, wherein determining the placement of the set of network devices comprises:
determining the placement of the set of network devices based on information related to a set of capabilities associated with each of the set of network devices and signal information from the set of existing network devices.

13. The computer-implemented method of claim 12, wherein determining the placement of the set of network devices comprises:
de-conflicting signals from the set of existing network devices in the smart city.

14. The computer-implemented method of claim 9, wherein determining the placement comprises:
determining a first network device from the set of network devices to place in the smart city based on a first set of capabilities associated with the first network device; and
determining placement of the first network device based on a physical terrain of the smart city and the mapped lidar and radio frequency data.

15. The computer-implemented method of claim 9, wherein determining the placement comprises:
for a first zone in a set of zones in the smart city, analyzing information related to a terrain of the first zone;
analyzing a wireless environment of the first zone; and
determining placement of a subset of the set of network devices in the first zone based on the analysis of the information related to the terrain and the analysis of the wireless environment.

16. The computer-implemented method of claim 1, wherein providing the visualization comprises:
providing an interactive map of the determined placement of the set of network devices in the smart city;
receiving input to change information related to a first placement of a first device of the set of network devices;
re-determining placement of the set of network devices based on the received input; and
providing an updated visualization of the re-determined placement of the set of network devices, including a second placement of the first device in the smart city.

17. A non-transitory machine-readable storage medium comprising instructions executable by a physical processor of a computing device for managing a smart city, the machine-readable storage medium comprising:
instructions to create a digital twin of the smart city based on mapping lidar data and radio frequency data for the smart city, the digital twin comprising the mapped lidar data and the mapped radio frequency data for the smart city;
instructions to identify a set of existing network devices in the city based on the mapped lidar and radio frequency data;
instructions to determine placement of a set of network devices in the smart city, where the set of network devices comprises the set of existing network devices and a set of new network devices; and instructions to provide a recommendation of the determined placement of the set of network devices.

18. The non-transitory machine-readable storage medium of claim 17, further comprising:

instructions to create the digital twin of the smart city based on imagery data for the smart city and the mapped lidar data and radio frequency data for the smart city.

19. The non-transitory machine-readable storage medium of claim 17, further comprising, wherein the instructions to determine placement of the set of network devices comprise:

instructions to determine the placement of the set of network devices based on information related to a set of capabilities associated with each of the set of network devices and signal information from the set of existing network devices.

20. The non-transitory machine-readable storage medium of claim 17, further comprising, wherein the instructions to determine placement of the set of network devices comprise:

instructions to analyze, for a first zone in a set of zones in the smart city, information related to a terrain of the first zone;

instructions to analyze a wireless environment of the first zone; and instructions to determine placement of a subset of the set of network devices in the first zone based on the analysis of the information related to the terrain and the analysis of the wireless environment.

* * * * *